United States Patent [19]

Murphy

[11] Patent Number: 5,076,540
[45] Date of Patent: Dec. 31, 1991

[54] STOP VALVE

[75] Inventor: Roger W. Murphy, Milford, Mich.

[73] Assignee: Brass-Craft Manufacturing Company, Southfield, Mich.

[21] Appl. No.: 609,970

[22] Filed: Nov. 6, 1990

[30] Foreign Application Priority Data

May 14, 1990 [SE] Sweden ................................. 901086

[51] Int. Cl.⁵ ...................... F16K 25/00; F16K 31/60
[52] U.S. Cl. ...................................... 251/175; 16/121;
74/553; 137/315; 251/310; 251/312
[58] Field of Search ..................... 16/121; 74/553, 558;
137/315; 251/175, 181, 182, 310, 311, 312, 313;
403/289, 326, 361

[56] References Cited

U.S. PATENT DOCUMENTS

| | | | |
|---|---|---|---|
| 3,481,367 | 12/1969 | Deuschle | 251/309 |
| 3,503,586 | 3/1970 | Bordes | 251/266 |
| 3,783,900 | 1/1974 | Waldbillig | 251/309 |
| 3,807,692 | 4/1974 | Usab et al. | 251/309 |
| 4,219,046 | 8/1980 | West et al. | 251/309 |
| 4,319,735 | 3/1982 | Moen | 251/175 |
| 4,562,994 | 1/1986 | MacDonald | 251/311 |
| 4,609,177 | 9/1986 | Turner et al. | 251/310 |
| 4,890,817 | 1/1990 | Uri | 251/312 |

Primary Examiner—George L. Walton
Attorney, Agent, or Firm—Myron B. Kapustij; Malcolm L. Sutherland

[57] ABSTRACT

A three-piece angle stop valve comprises a valve body, resilient control sleeve and handle, with no separate fastening or sealing elements required. Inlet line pressure resiliently biases the side walls of the control sleeve and a circumferential sealing flap formed thereon into sealing engagement with the valve bore to prevent leakage. The handle is secured to the valve body by resilient formations which snap into a circumferential groove on the valve body. The handle rotates the control sleeve by means of telescoping splines. Several circumferential and axial reinforcing ribs are formed in the interior of the control sleeve. A collar having a tapered rim in the valve body piercingly engages a corresponding tapered section on the resilient control sleeve to additionally secure the control sleeve against axial downstream movement in the valve body.

23 Claims, 2 Drawing Sheets

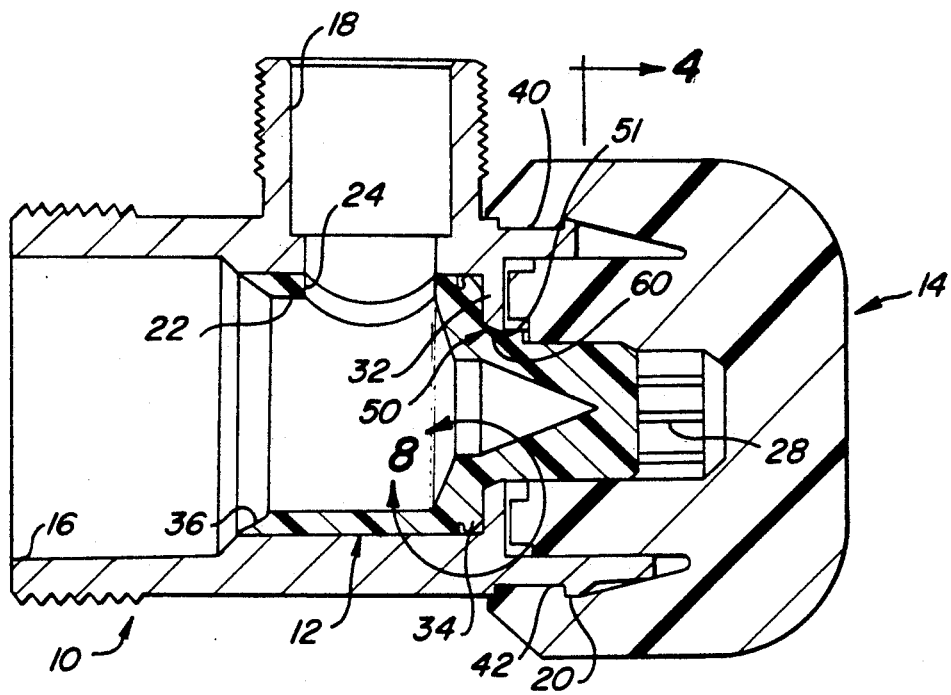
*Fig-1*
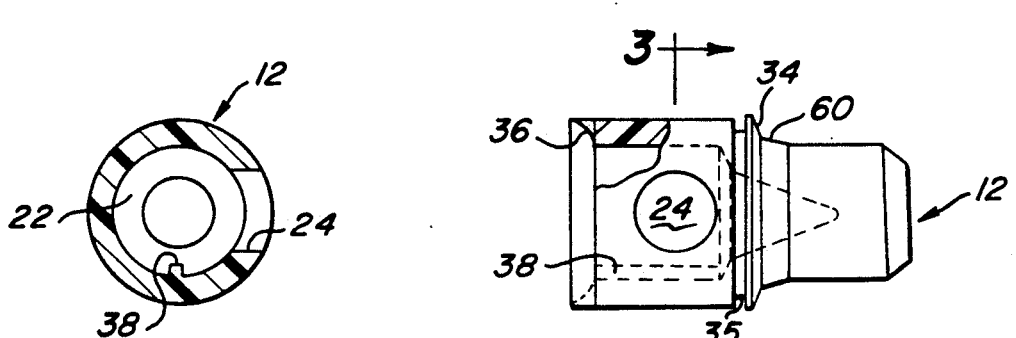
*Fig-3*  *Fig-2*
*Fig-4*

STOP VALVE

BACKGROUND OF THE INVENTION

This invention relates to stop valves commonly used in water supply lines leading to sinks, toilets and the like. A stop valve is simply a shut-off valve to permit replacement of washers or other repairs to be accomplished on a fixture valve without shutting down an entire plumbing system. The stop valve is commonly located in the fixture supply line between the wall and the fixture. Stop valves are generally available in two basic styles. One style is known as an angle stop valve, wherein the inlet and outlet of the valve are at right angles to each other. The other standard configuration is a straight-through arrangement wherein the inlet and outlet are coaxially aligned with each other.

One type of effective, simple and efficient angle stop valve is disclosed in U.S. Pat. No. 4,609,177 to Turner et al, incorporated herein by reference. While this stop valve is effective and efficient, there may be a possibility, under certain unique circumstances, of separation of the resilient control sleeve from the handle. This may result in longitudinal downstream displacement of the sleeve in the valve body, particularly if there is no water in the supply line. The circumstances under which a separation may be possible are continuous repeated turning of the handle in the absence of water in the supply line, or damage to the handle or valve body in the areas of attachment of the handle to the body.

The present invention is directed to reducing or even eliminating the longitudinal displacement of the control sleeve in the remote possibility of handle separation from the resilient control sleeve.

SUMMARY OF THE INVENTION

The stop valve of the present invention includes just three parts: valve body, resilient control sleeve and handle. No supplementary sealing or securing elements are required. The handle is secured to the valve body by formations which resiliently snap into a circumferential ring on the valve body. Cooperating splines provide a driving connection between the handle and control sleeve to cause them to rotate together. A tapered collar in the valve body bore engages a tapered shoulder on the sleeve to prevent the sleeve from being blown out of the valve in the event of excessive fluid pressure and failure of the handle-retaining formations, and to prevent downstream axial or longitudinal displacement of said sleeve in the valve body bore in case of separation of the handle from the sleeve. The control sleeve has a resilient circumferential sealing flap which is dimensioned to provide an interference fit with the valve body bore, providing an effective seal and frictionally preventing withdrawal of the sleeve. The inlet end of the control sleeve has a reduced wall thickness to increase its radial yieldability to provide increased sealing pressure under low fluid pressure conditions.

BRIEF DESCRIPTION OF THE DRAWINGS

FIG. 1 is a cross-sectional view of the stop valve assembly of the present invention, shown in the open condition of the valve.

FIG. 2 is a top view of the control sleeve of FIG. 1.

FIG. 3 is a cross-sectional view of the control sleeve, viewed in the direction of arrows 3—3 of FIG. 2.

FIG. 4 is a cross-sectional view of the assembly, viewed in the direction of arrows 4—4 of FIG. 1.

DETAILED DESCRIPTION

Figure 5:
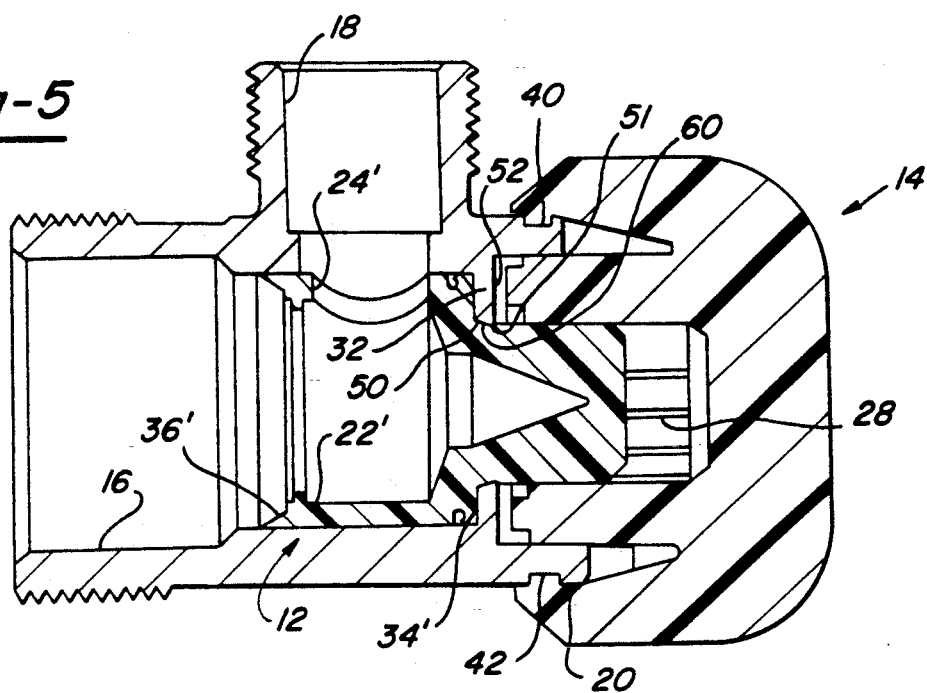
FIG. 5 is a view similar to FIG. 1, but showing a modified embodiment of the control sleeve.

FIG. 1 illustrates an angle stop valve of the type wherein a one-quarter turn of the handle is sufficient to change the condition of the valve from the illustrated fully open condition to fully closed. The valve generally comprises a valve body 10 which receives a resilient control sleeve 12 which is selectively rotated by a handle 14.

The valve body 10 includes inlet bore 16 adapted to be connected to a water supply line, outlet bore 18 adapted to be connected to an outlet line and neck 20 which rotatably supports and interconnects with handle 14 in a manner to be described below.

Resilient control sleeve 12 is rotatably mounted within valve body inlet bore 16 and is inserted from the opening thereof, that is, from the left toward the right as viewed in FIG. 1. The cylindrically shaped side wall of control sleeve 12 is provided with a port 24 which may be selectively brought into registry with valve body outlet bore 18 to establish a fluid flow path from inlet bore 16, through sleeve bore 22 and port 24 and finally out through outlet bore 18.

The closed or right-hand end of control sleeve 12 is of reduced diameter and is provided with longitudinally extending splines 26 which telescopically interfit with internal splines 28 in handle 14. As best shown in FIG. 4, these splines are asymmetrically arranged around the circumference of the control sleeve so that the handle and control sleeve can only be assembled in one relative angular relationship. This feature, when coupled with appropriate positional indicia on the exterior of the handle, permits the operator to determine the on-off condition of the valve.

Control sleeve 12 is further provided with a radially projecting circumferential sealing lip or flap 34 immediately adjacent to a circumferential groove 35 and abutting valve body collar 32. The outer diameter of flap 34 is shaped and dimensioned to be larger than the opposed bore of valve body, so that assembly results in flap 34 being forced radially inwardly and toward the left to establish a continuous radially outward sealing pressure against the valve body bore. The diameter of the main body portion of the control sleeve 12 is dimensioned to be very snuggly received within the opposed portion of valve body inlet bore 16, to minimize any potential for water leakage therebetween. However, if any leakage occurs along the outer diameter of the sleeve, the water will enter groove 35 and pressurize the left side of flap 34, tending to increase its outward pressure against the valve body bore to further enhance the seal at that interface. Furthermore, the dimensions and shape of flap 34 also cause it to increase its frictional engagement with the valve body bore if the sleeve moves toward the left, thereby preventing misalignment of port 24 and bore 18 and preventing removal of the sleeve from the valve body.

As best shown in FIG. 2, the closed or right-hand end of control sleeve 12 has a tapered section 60 adjacent to and upstream of sealing flap 34. The tapered section 60 extends around the entire circumference of the closed end of control sleeve 12. The taper angle formed with the center axis of the control sleeve is generally from about 6° to about 25°, preferably from about 8° to about 20°, and more preferably from about 10° to about 15°. The tapered section 60 forms a taper lock with the tapered collar 32 as more fully described hereinafter to prevent longitudinal downstream movement of the control sleeve in the valve body bore in the unlikely possibility of handle separation from the control sleeve.

As a further aid in preventing leakage between the outer periphery of control sleeve 12 and inlet bore 16, the inlet end of control sleeve 12 is formed with an end lip 36 of reduced wall thickness. Therefore, even under low fluid pressure conditions, the locally weakened portion of the control sleeve 12 will tend to be forced radially outwardly against the valve body bore by the fluid pressure which always exists within the interior bore 22 of the control sleeve.

As shown in FIG. 3, control sleeve 12 is further provided with a single longitudinally extending reinforcing rib 38 along its internal bore 22. The axial position and length of rib 38 is selected to substantially correspond with the diameter of valve body outlet bore 18, and the angular position of such rib is spaced a quarter turn from control sleeve port 24. This arrangement places rib 38 directly across the diameter of valve body outlet bore 18 when the control sleeve is in its closed position. The rib locally increases the stiffness of the control sleeve wall and prevents it from bulging radially outwardly into outlet bore 18 under high fluid pressure conditions when the valve is in its closed position. Such bulging would be undesirable because it would tend to produce wear on the exterior surface of the control sleeve as such surface rubbed against the opposed edges of the outlet bore opening when the control sleeve was moved from the closed toward the open position.

Neck 20 of valve body 10 has a circumferential groove 40 which receives a plurality of circumferentially spaced radially inwardly projecting handle retaining bosses 42. As can be seen in FIG. 1, handle 14 is constructed so that its outer circumference is radially yieldable as the handle is pressed toward the left over the conically configured tip of valve body neck 20. Continued leftward movement of the handle causes retaining lips 42 to be cammed radially outwardly until they snap resiliently inwardly into neck groove 40. In this manner, handle 14 is rotatably mounted on and connected to valve body 10, without the need for any supplementary fastening devices. As previously described, such leftward movement of handle 14 during assembly is permitted by the telescoping interfitting relationship of splines 26 with splines 28 of the previously inserted control sleeve, once the proper angular relationship is established between handle 14 and control sleeve 12.

As shown in FIGS. 1 and 4, the extreme right-hand end of neck 40 is recessed for approximately one-half of its circumference, establishing rotation stop faces 44 and 46 where the recessed portion meets the unrecessed portion. In cooperation with handle stop boss 48 (See FIG. 4), rotation of handle 14 in the counterclockwise direction (as viewed in FIG. 4) from the position shown causes stop boss 48 to abut stop face 46, thereby establishing the closed position after a little more than 90 degrees of rotation. Similarly, rotation in the clockwise direction from such closed position to the illustrated open position of the valve brings the other end of stop boss 48 into abutting engagement with the other stop face 44, establishing the open position of the valve. As is evident from FIG. 4, the angular extent of stop boss 49 is slightly less than 90 degrees in the preferred embodiment of the invention.

Collar 32 of the valve body serves several functions. First, it establishes the proper axial position of the control sleeve relative to outlet bore 18 by its abutting engagement with the shoulder on control sleeve 12 adjacent sealing flap 34. This engagement assures the proper axial registry of port 24 with outlet bore 18. Second, collar 32 also provides a safety feature in that fluid pressure cannot blow or force control sleeve 12 out to the right or upstream through valve body neck 20 in the event that the interlock between handle 14 and neck groove 40 has been destroyed or the handle has otherwise been removed from the valve body.

Figure 7:
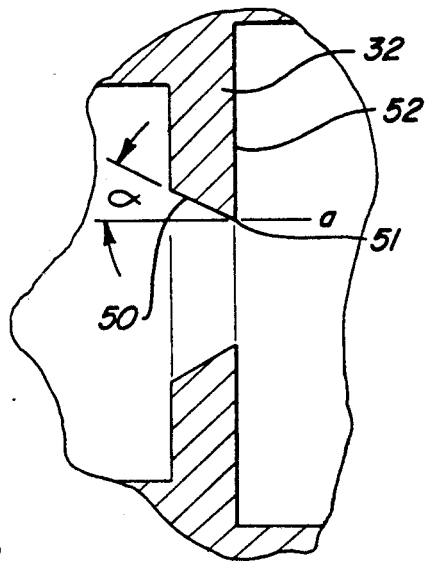
FIG. 7 is an enlarged cross-sectional view of the collar having a tapered rim.

The collar 32 has a tapered inner rim 50. The rim is tapered in a downstream direction of the valve body and has a piercing point 51 at its upstream side 52, i.e., the side adjacent the handle 14. The taper angle α formed with the center axis of the valve body, represented by line "a" in FIG. 7, is an angle which is sufficient to form a piercing point 51 effective to pierce the tapered portion 60 of the resilient control sleeve 12. Generally this angle is from about 12° to about 35°, preferably from about 15° to about 30°, and more preferably from about 18° to about 25°.

Figure 8:
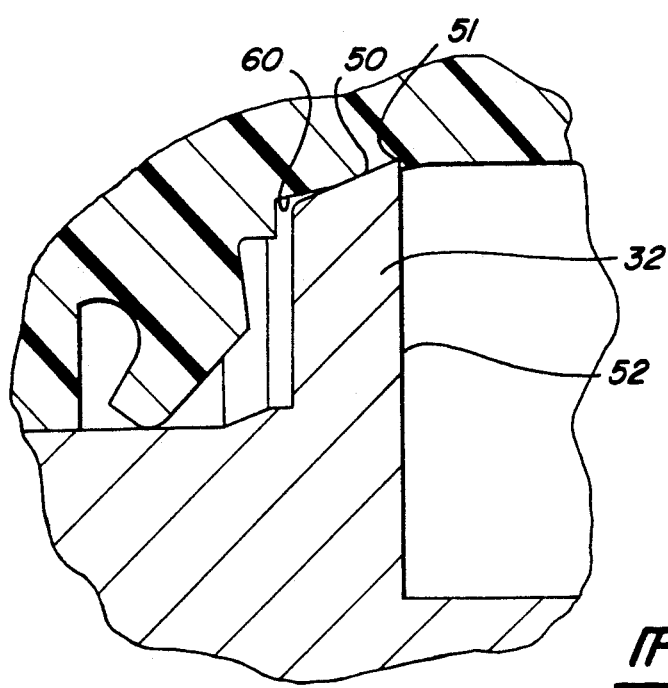
FIG. 8 is an enlarged view of the indicated portion of FIG. 1.

When the tapered rim 50 of the collar 32 piercingly engages the tapered portion 60 of the control sleeve as illustrated in FIG. 8, the sleeve and collar 32 are taper locked together, thereby preventing longitudinal or axial downstream movement of the control sleeve in the valve body inlet bore 16 in the unlikely event of separation of the control sleeve 12 from the handle 14. However, the control sleeve can nevertheless still be rotated with relative ease in the valve body 10.

It is important that the difference between the taper angle of the rim 50 of the collar 32 and the tapered section 60 of the control sleeve (i.e., taper angle of rim 50 minus taper angle of tapered portion 60) ranges from about 2° to about 35°, preferably from about 3° to about 20°, and more preferably from about 5° to about 10°. If the taper angle of the rim 50 and the tapered portion 60 are the same, i.e., the difference between the two taper angles is 0, the piercing point 51 of the rim 50 will not penetrate or extend into the tapered section 60, and the control sleeve will not be locked to the collar against longitudinal or axial downstream displacement in the bore 16. If the difference between the two angles is greater than zero but less than about 2°, a major portion of the surface of tapered rim 50 will be in surface to surface contact with the surface of tapered portion 60 of the control sleeve. This results in increased torque required to rotate the control sleeve. If, on the other hand, the difference between the two angles exceeds about 35°, too little of the rim 50 is in contact with the tapered section 60 of the control sleeve. Since the interface of rim 50 of the collar 32 and the tapered section 60 of the control sleeve also functions as a secondary seal to prevent water leakage, reducing the interface contact therebetween tends to adversely affect the sealing function.

Because of the differences in taper angles between the rim 50 and the tapered section 60 a portion of the collar 32 has a larger internal diameter than the outer diameter of the tapered section 60. This portion, as illustrated in FIG. 8, is the upstream portion, i.e., the portion adjacent to and including the piercing point 51. The downstream portion of the collar 32 furthest removed from the piercing point 51, on the other hand, has a smaller internal diameter than the outer diameter of the tapered section 60 of the control sleeve.

The valve body is preferably formed of extruded brass which is subsequently machined. The control sleeve is formed of a low friction resilient thermoplastic material, preferably Santoprene 103-40, manufactured by Monsanto. The handle can be formed of a durable plastic material such as ABS having a proper degree of resilience to permit its assembly to the valve body in the manner described above.

It is contemplated that an alternative embodiment of the invention may be constructed with the portion of control sleeve 12 to the left of circumferential groove 35 being formed with a conical rather than cylindrical wall. That is, the diameter would be progressively greater toward the open left end of the sleeve.

Figure 6:
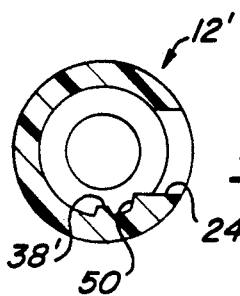
FIG. 6 is a view similar to FIG. 3, but showing the modified sleeve of FIG. 5.

FIGS. 5-6 illustrate two additional optional features. One is the inclusion of an additional internal longitudinal rib 50 at the leading edge of port 24 as the valve is turned to the closed position. In this position, such additional rib provides additional rigidity as the pressure within the sleeve builds up, during valve closing, to prevent the sleeve from ballooning or bulging outwardly into the outlet port. Another optional feature is the inclusion of a radially inwardly projecting circumferential rib 52 adjacent to end flap 36, which rib provides additional stiffness to the sleeve wall to prevent it from collapsing radially inwardly. Finally, for additional protection against leakage, should it be considered necessary, an O-ring can be provided around the portion of handle 14 which extends inside valve body neck 20, with appropriate O-ring-receiving grooves being provided.

This invention may be further developed within the scope of the following claims. Accordingly, the above specification is to be interpreted as illustrative of only a single operative embodiment of the present invention, rather than in a strictly limited sense.

I claim:

1. A plumbing valve comprising:
   a valve body having an inlet bore and an outlet bore;
   a resilient control sleeve located within said valve body for rotation therein, said sleeve being open at one axial end and closed at the other axial end, and having a side wall of circular cross-section between said ends, said side wall having at least one port;
   said control sleeve side wall having a first portion contoured and dimensioned to be snuggly but rotatably received within a sleeve receiving bore of said valve body, said valve body sleeve bore communicating with both said inlet and said outlet bores;
   a handle connected to said closed end of said control sleeve for rotating said control sleeve between a closed position of the valve, wherein said side wall blocks communication between said inlet and outlet bores, thereby preventing fluid from flowing through the valve, and an open position of the valve wherein a flow path is established between said inlet and outlet bores via said port and the interior of said control sleeve;
   said valve body and said control sleeve being constructed to maintain continuous communication between said inlet bore and the interior of said control sleeve, to thereby pressurize said interior and resiliently bias said side wall radially outwardly against said valve body sleeve bore;
   said valve body sleeve bore having a radially extending collar portion of smaller internal diameter than said outer diameter of said first portion of said control sleeve that extends into said valve body whereby said collar acts as a stop to limit axial travel of said control sleeve along the length of said valve body sleeve bore;
   said first portion of said control sleeve having a circumferential groove and a circumferential sealing flap located between said groove and said collar portion, said sealing flap having an outer diameter greater than the internal diameter of the opposed portion of said valve body sleeve bore and contoured to pivot radially inwardly and axially toward said open end of said sleeve bore and partially into said circumferential groove as a result of the interference fit with the walls of said valve body sleeve bore;
   said control sleeve side wall having a second portion upstream of said circumferential sealing flap having an outer diameter smaller than said first portion, said second portion having a tapered section adjacent said circumferential sealing flap; and
   said collar portion of said valve body sleeve having a tapered rim, such that at least a portion of said collar portion has a diameter which is greater than the outer diameter of said tapered section of said second wall portion, whereby at least a portion of said collar piercingly engages said tapered section of said second wall portion for gripping said control sleeve to align said control sleeve within said valve body and controlling longitudinal and axial movement of said control sleeve within valve body.

2. The valve of claim 1 wherein the taper angle of said rim is greater than the taper angle of said tapered section.

3. The valve of claim 2 wherein the taper angle of said rim is from about 12° to about 35° and the taper angle of said tapered section is from about 6° to about 25°.

4. The valve of claim 3 wherein the taper angle of said rim is from about 15° to about 30° and the taper angle of said tapered section is from about 8° to about 20°.

5. The valve of claim 4 wherein the taper angle of said rim is from about 18° to about 25° and the taper angle of said tapered section is from about 10° to about 15°.

6. The valve of claim 1 wherein said handle includes retaining formations formed thereon for engaging complementary retaining formations on said valve body for connecting said handle to said valve body without separate fastening elements, while permitting said handle to rotate relative to said valve body.

7. The valve of claim 1 wherein said handle includes driving formations integrally formed thereon for establishing a rotary driving connection with complementary driving formations integrally formed on said closed end of said control sleeve for rotating said control sleeve within said sleeve bore.

8. A plumbing valve comprising:

a valve body having an inlet bore and an outlet bore;

a resilient control sleeve located within said valve body for rotation therein, said sleeve being open at one axial end and closed at the other axial end, and having a side wall of circular cross-section between said ends, said side wall having at least one port;

said control sleeve side wall having a first portion contoured and dimensioned to be snuggly but rotatably received within a sleeve receiving bore of said valve body, and a second portion of a reduced outer diameter between said first portion and the closed axial end, said second portion having a tapered section adjacent said first portion, said valve body sleeve bore communicating with both said inlet and said outlet bores;

a handle connected to said closed end of said control sleeve for rotating said control sleeve between a closed position of the valve, wherein said side wall blocks communication between said inlet and outlet bores, thereby preventing fluid from flowing through the valve, and an open position of the valve wherein a flow path is established between said inlet and outlet bores via said port and the interior of said control sleeve;

said valve body and said control sleeve being constructed to maintain continuous communication between said inlet bore and the interior of said control sleeve, to thereby pressurize said interior and resiliently bias said side wall radially outwardly against said valve body sleeve bore;

said first portion of said control sleeve side wall having a substantially reduced wall thickness immediately adjacent said open end as compared with the adjacent portions of said first portion side wall, to facilitate radially outward deflection thereof into tighter sealing contact against said valve body sleeve bore during relatively low fluid pressure conditions;

said valve body having a radially extending collar having a tapered rim, such that at least a portion of said collar has a diameter which is greater than the outer diameter of said tapered section of said control sleeve that extends into said valve body, whereby at least a portion of said collar piercingly engages said tapered section of said control sleeve for gripping said control sleeve to align said control sleeve within said valve body and controlling longitudinal and axial movement of said control sleeve within said valve body.

9. The valve of claim 8 wherein the taper angle of said rim is greater than the taper angle of said tapered section.

10. The valve of claim 9 wherein the taper angle of said rim is from about 12° to about 35° and the taper angle of said tapered section is from about 6° to about 25°.

11. The valve of claim 10 wherein the taper angle of said rim is from about 15° to about 30° and the taper angle of said tapered section is from about 8° to about 20°.

12. The valve of claim 11 wherein the taper angle of said rim is from about 18° to about 25° and the taper angle of said tapered section is from about 10° to about 15°.

13. The valve of claim 8 wherein the bore of said control sleeve has a radially inwardly projecting circumferential reinforcing rib located between said port and said end portion of reduced wall thickness.

14. A plumbing valve comprising:

a valve body having an inlet bore and outlet bore;

a resilient control sleeve located within said valve body for rotation therein, said sleeve being open at one axial end and closed at the other axial end, and having a side wall of circular cross-section between said ends, said side wall having at least one port;

said control sleeve side wall having a first portion contoured and dimensioned to be snuggly but rotatably received within a sleeve receiving bore of said valve body, and a second portion between said first portion and said closed axial end having an outer diameter smaller than the outer diameter of said first portion and having a tapered section adjacent said first portion, said valve body sleeve bore communicating with both said inlet and said outlet bores;

a handle connected to said closed end of said control sleeve for rotating said control sleeve between a closed position of the valve, wherein said side wall blocks communication between said inlet and outlet bores, thereby preventing fluid from flowing through the valve, and an open position of the valve wherein a flow path is established between said inlet and outlet bores via said port and the interior of said control sleeve;

said valve body and said control sleeve being constructed to maintain continuous communication between said inlet bore and the interior of said control sleeve, to thereby pressurize said interior and resiliently bias said side wall radially outwardly against said valve body sleeve bore;

said first portion of said control sleeve side wall having a radially inwardly projecting reinforcing rib extending axially therealong, said rib being circumferentially positioned to stiffen the portion of said side wall which blocks said valve body outlet bore in the fully closed position of said valve, thereby to reduce the tendency of high fluid pressure within said control sleeve to cause said side wall to bulge radially outwardly into said outlet bore;

said valve body having a radially extending collar having a tapered rim, such that at least a portion of said collar has a diameter greater than the outer diameter of said tapered section of said control sleeve that extends into said valve body, whereby at least a portion of said collar piercingly engages said tapered section thereby securing said control sleeve against axial downstream movement within said inlet bore of said valve body for gripping said control sleeve to align said control sleeve within said valve body and controlling longitudinally and axial movement of said control sleeve within said valve body.

15. The valve of claim 14 wherein the taper angle of said rim is greater than the taper angle of said tapered section.

16. The valve of claim 15 wherein the taper angle of said rim is from about 12° to about 35° and the taper angle of said tapered section is from about 6° to about 25°.

17. The valve of claim 16 wherein the taper angle of said rim is from about 15° to about 30° and the taper angle of said tapered section is from about 8° to about 20°.

18. The valve of claim 17 wherein the taper angle of said rim is from about 18° to about 25° and the taper angle of said tapered section is from about 10° to about 15°.

19. The valve of claim 18 wherein said first portion of said control sleeve side wall has a second radially inwardly projecting reinforcing rib extending axially therealong, said rib being circumferentially positioned immediately adjacent said port on the side of said port which advances across said valve body outlet bore during closing of the valve, thereby to reduce the tendency of high fluid pressure within the control sleeve to cause said side wall to bulge radially outwardly into said outlet bore in the partially closed position of the valve.

20. The valve of claim 14 wherein said first portion of said control sleeve side wall having a substantially reduced wall thickness immediately adjacent said open end as compared with the adjacent portions of said first portion side wall, to facilitate radially outward deflection thereof into tighter sealing contact against said valve body sleeve bore during relatively low fluid pressure conditions.

21. The valve of claim 20 wherein the bore of said control sleeve has a radially inwardly projecting circumferential reinforcing rib located between said port and said end portion of reduced wall thickness.

22. The valve of claim 14 wherein said handle includes retaining formations formed thereon for engaging complementary retaining formations on said valve body for connecting said handle to said valve body without separate fastening elements, while permitting said handle to rotate relative to said valve body.

23. The valve of claim 14 which consists solely of said valve body, said control sleeve and said handle, without any separate sealing or fastening components to secure and seal said three elements together.

* * * * *

UNITED STATES PATENT AND TRADEMARK OFFICE
CERTIFICATE OF CORRECTION

PATENT NO. : 5,076,540
DATED : December 31, 1991
INVENTOR(S) : Roger W. Murphy

It is certified that error appears in the above-indentified patent and that said Letters Patent is hereby corrected as shown below:

On the Title page, please delete the following:

" (30)   Foreign Application Priority Data

May 14, 1990 (SE)  Sweden ............901086"

Signed and Sealed this

Sixth Day of August, 1996

Attest:

BRUCE LEHMAN

*Attesting Officer*   Commissioner of Patents and Trademarks